Figures 1, 3:
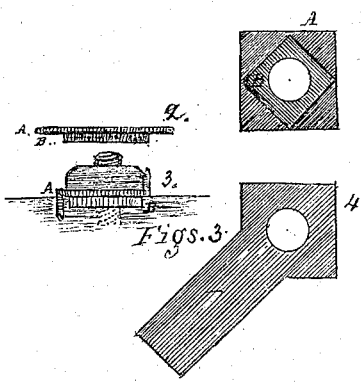

C. Dittman,

Nut Lock.

No. 103,308.  Patented May 24, 1870.

Witnesses.  Inventor.
W. B. Wiley  Caspar Dittman
Jacob Stauffer

United States Patent Office.

CASPER DITTMAN, OF LEACOCK, PENNSYLVANIA.

Letters Patent No. 103,308, dated May 24, 1870.

---

IMPROVEMENT IN NUT-LOCK.

---

The Schedule referred to in these Letters Patent and making part of the same

---

I, CASPER DITTMAN, of Leacock, in the county of Lancaster and State of Pennsylvania, have invented certain Improvements on Nut-Fasteners, of which the following is a specification.

The object of my invention is of that class contrived to secure the nuts on the end of screw-bolts, to prevent them from getting loose, consisting of a kind of lock-washer.

The accompanying drawing illustrates the construction and mode of application.

Figure 3, the fastener detached.

1, 2, and 4, No. 5, is a loose prolongation, which may be attached by a rivet.

Number 3 shows one corner turned down into the wood, the other up against the nut, on opposite sides.

The fasteners, A B, consist of a double square, that is, the inner perforated square disk B, through which the bolt passes, is raised, as shown. This disk has a flange, A, of three or four corners, projecting beyond the raised central disk, so that the corners come opposite the center of the sides of the inner disk. Being made of malleable iron, or other yielding metal, the corners can be turned up or down against the nut, or driven into the wood, as shown, (3.)

4 shows a fastener having the central disk B, with one side of the flange A prolonged, seen in Figure 4, or bent around the corner of the timber, as shown by 6, Figure 2.

This prolongation might unite a disk and flange at each end, so as to confine two burs with a double fastener, as shown by number 7. The raised disk is calculated for being let into the wood, boxed out for its reception, and, when the nut is drawn down tight upon the fastener, the corners projecting are bent up against the sides of the bur; the square disk, being imbedded in the wood, prevents it from turning, and the corners turned up to embrace the bur confine it also, and thus secure it.

I am aware that square fasteners are not new. Patent No. 94,885, of September 14, 1869, is made to turn up, but has not the central diagonal disk, shown, as also in the right and left screw-fastener between two burs, as in patent of October 12, 1869, No. 95,704. In the first, the nut and fastener are arranged and operated substantially in a different manner, as also in the other referred to, both of which arrangements I disclaim. I am not aware of a washer, having a central raised disk in a diagonal position to that of the projecting flange corners or prolongation of one of one of its sides. The various methods of applying the same are shown in the drawing. In one case, three projecting corners, instead of four, are used.

What I claim as my invention, is—

The lock-washer, consisting of a square central disk, B, and thin diagonal corner flanges A, one of which may be prolonged, as herein shown and described.

CASPER DITTMAN.

Witnesses:
WM. B. WILEY,
JACOB STAUFFER.